(No Model.)
J. M. WELCH.
MOLE TRAP.
No. 371,649. Patented Oct. 18, 1887.
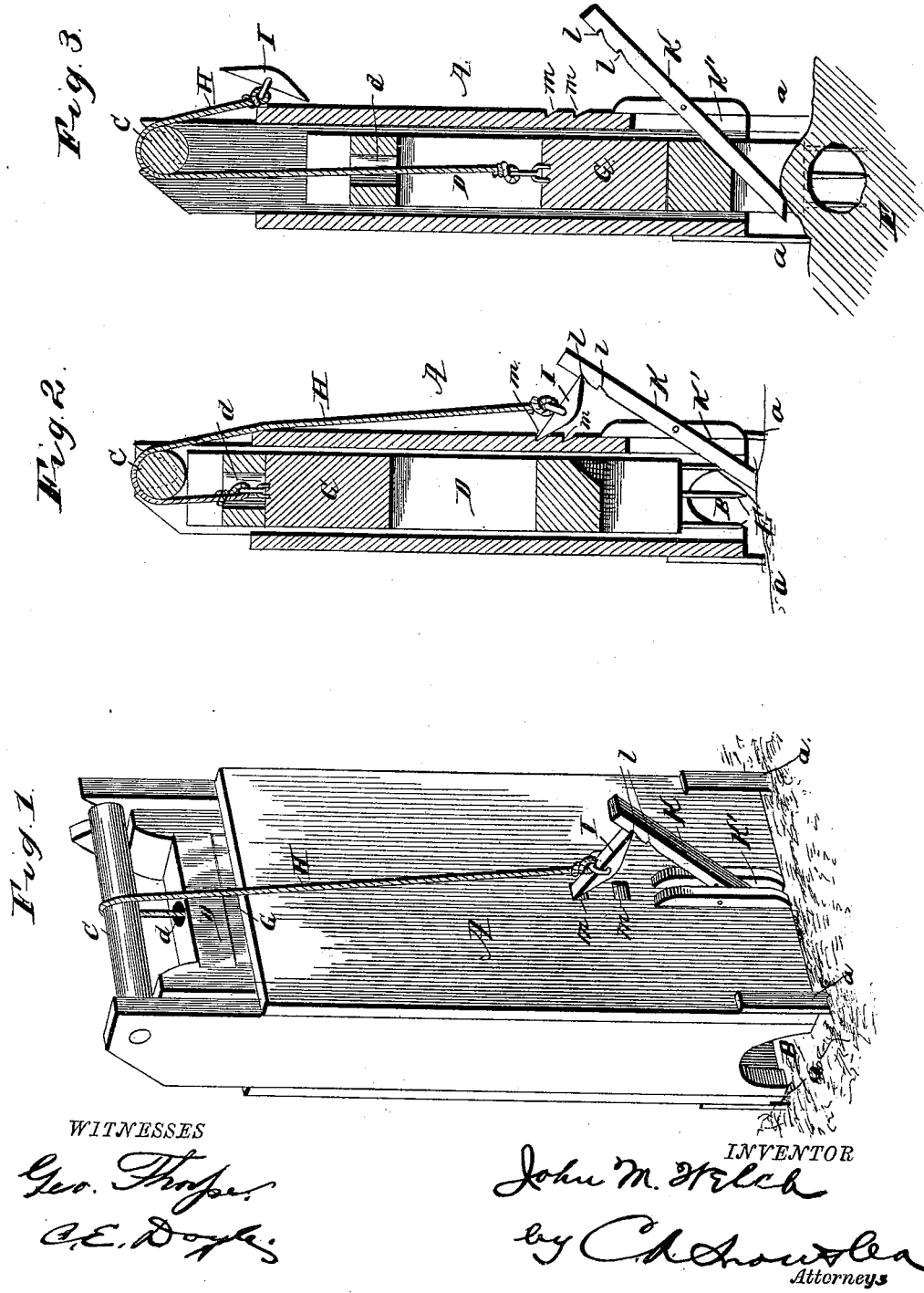
WITNESSES
Geo. Thorpe
C. E. Doyle
INVENTOR
John M. Welch
by C. A. Snowden
Attorneys

UNITED STATES PATENT OFFICE.

JOHN MILZE WELCH, OF ANNAPOLIS, INDIANA.

MOLE-TRAP.

SPECIFICATION forming part of Letters Patent No. 371,649, dated October 18, 1887.

Application filed May 21, 1887. Serial No. 238,994. (No model.)

*To all whom it may concern:*

Be it known that I, JOHN MILZE WELCH, a citizen of the United States, residing at Annapolis, in the county of Parke and State of Indiana, have invented a new and useful Improvement in Mole-Traps, of which the following is a specification.

My invention relates to a mole-trap; and it consists in a certain novel construction and combination of parts, hereinafter more fully described, and pointed out in the appended claim.

In the drawings hereto annexed, Figure 1 is a perspective view of the trap. Fig. 2 is a vertical transverse section. Fig. 3 is a similar view with the trap sprung.

Referring by letter to the drawings, A designates the body of the trap, having the sharpened feet $a\ a$ on the bottom, the curved recesses B B formed in the lower edges of the sides, and the roller C journaled in the upper end, for a purpose hereinafter explained.

D designates a sliding frame vertically movable in the body A, to the lower edge of which are attached the sharpened wires or pins E, while the cross-piece at the upper end is provided with an aperture, $d$.

G designates a weight movable vertically in the frame D, to the upper side of which is attached a cord, H, which cord passes up through the aperture $d$, over the roller C, and is attached at the lower end to a short bar, I, the use of which is hereinafter described.

K designates a trigger pivoted in a slot, K′, in the face of the trap, the inner end of which trigger is beveled to rest flat on the surface of the ground when the trap is set, and the upper end of the said trigger is provided with the notches $l\ l$.

The bar I is adapted to engage at one end in one of the notches $l$ in the upper end of the trigger, and at the other end in one of the notches $m\ m$ in the face of the trap above the slot K′.

The manner of using the trap is as follows: When the run of the mole has been discovered, place the trap over the same with the recesses B B in the sides of the trap aligned therewith, and force the feet $a\ a$ into the ground on each side of the run. Draw the weight, and with it the sliding frame, up to the upper end of the body by means of the cord H; elevate the outer end of the trigger, and engage the bar I in one of the notches therein and one of the notches $m$ in the face of the trap. It will be seen that the lower ends of the pins E are on the level with the surface of the ground and the beveled end of the trigger is resting on the surface of the ground directly over the run of the mole. When the mole passes along the run, the ground over him will be slightly raised, and as he passes under the end of the trigger it will be raised, release the bar I, and allow the weight to fall. The weight, as has been stated, is at the upper end of the frame D, and when it is released it drops, strikes with force against the lower cross-piece of the same, and drives the pins E into the ground, thereby impaling the mole.

The action of this trap is very direct, as will be seen, and the pins are driven into the ground almost at the same instant that the trigger is raised by the mole, thus rendering the capture of the said animal certain.

Having thus described the construction and operation of my invention, what I claim, and desire to secure by Letters Patent of the United States, is—

The combination, with the body resting on the ground and having the slot K′ in its lower side and the notches $m$ above said slot, of the trigger pivoted in said slot and provided with notches $l$ in its upper end, its lower end resting on the ground, the sliding frame working in the body and carrying the impalement-pins, the weight G, movable vertically in the sliding frame and acting on the lower cross-bar of the same, the cord attached to said weight and passing over a roller in the upper end of the body, and the bar I, secured to the free end of said cord and having its opposite ends normally engaging the notches $m$ in the body and the notches $l$ in the trigger, substantially as specified.

In testimony that I claim the foregoing as my own I have hereto affixed my signature in presence of two witnesses.

JOHN MILZE WELCH.

Witnesses:
HENRY C. LAMB,
PAUL M. VESTAL.